(12) United States Patent
Madden et al.

(10) Patent No.: US 8,693,118 B1
(45) Date of Patent: Apr. 8, 2014

(54) TIMING ACQUISITION ROBUST TO INTER-TRACK-INTERFERENCE

(75) Inventors: Michael Madden, Mountain View, CA (US); Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/551,016

(22) Filed: Jul. 17, 2012

Related U.S. Application Data

(60) Provisional application No. 61/509,981, filed on Jul. 20, 2011.

(51) Int. Cl.
*G11B 5/02* (2006.01)

(52) U.S. Cl.
USPC .......................................................... 360/27

(58) Field of Classification Search
None
See application file for complete search history.

(56) References Cited

U.S. PATENT DOCUMENTS 5,181,161 A * 1/1993 Hirose et al. ................ 369/47.26
5,495,460 A * 2/1996 Haraguchi et al. ......... 369/53.24

\* cited by examiner

*Primary Examiner* — Paul Huber

(57) ABSTRACT

A system includes a preamble determination module configured to determine an expected preamble of a target track. The expected preamble includes an associated timing recovery pattern. A filter module is configured to receive a readback signal read from the target track based on the expected preamble, and selectively filter the readback signal to remove inter track interference from the readback signal based on the expected preamble.

16 Claims, 5 Drawing Sheets

TIMING ACQUISITION ROBUST TO INTER-TRACK-INTERFERENCE

CROSS-REFERENCE TO RELATED APPLICATIONS

This application claims the benefit of U.S. Provisional Application No. 61/509,981, filed on Jul. 20, 2011. The disclosure of the above application is incorporated herein by reference in its entirety.

FIELD

The present disclosure relates to timing recovery associated with reading data stored on a hard disk drive.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a hard disk drive (HDD), data is stored on concentric tracks on a disk. Each of the tracks includes, for example, servo wedges and addressable data sectors. Each of the data sectors includes a preamble and a sync mark followed by user data. The preamble includes a timing recovery pattern. For example, the timing recovery pattern may include a repeating pattern (i.e., tone). A read channel of the HDD performs timing acquisition for reading the user data from the track based on the timing recovery pattern of the preamble. The sync mark follows the preamble and indicates the start of the user data.

In some circumstances, a signal read from a target track may include interference from adjacent tracks. For example, preambles of adjacent tracks may interfere (e.g., may cause inter track interference, or ITI) with an ability of a read channel to detect the preamble of the target track.

SUMMARY

A system includes a preamble determination module configured to determine an expected preamble of a target track. The expected preamble includes an associated timing recovery pattern. A filter module is configured to receive a readback signal read from the target track based on the expected preamble, and selectively filter the readback signal to remove inter track interference from the readback signal based on the expected preamble.

In other features, the inter track interference corresponds to at least one preamble of a corresponding track adjacent to the target track. The at least one preamble includes a second timing recovery pattern that is different than the timing recovery pattern.

In other features, the preamble determination module is configured to determine filter parameters based on the expected preamble. The filter module is configured to filter the readback signal based on the filter parameters.

A method includes determining an expected preamble of a target track. The expected preamble includes an associated timing recovery pattern. The method includes receiving a readback signal read from the target track based on the expected preamble and selectively filtering the readback signal to remove inter track interference from the readback signal based on the expected preamble.

In other features, the inter track interference corresponds to at least one preamble of a corresponding track adjacent to the target track. The at least one preamble includes a second timing recovery pattern that is different than the timing recovery pattern.

In other features, determining the expected preamble includes determining the expected preamble based on at least one of a determination of whether the target track is an even track or an odd track, servo data associated with the target track, and the readback signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
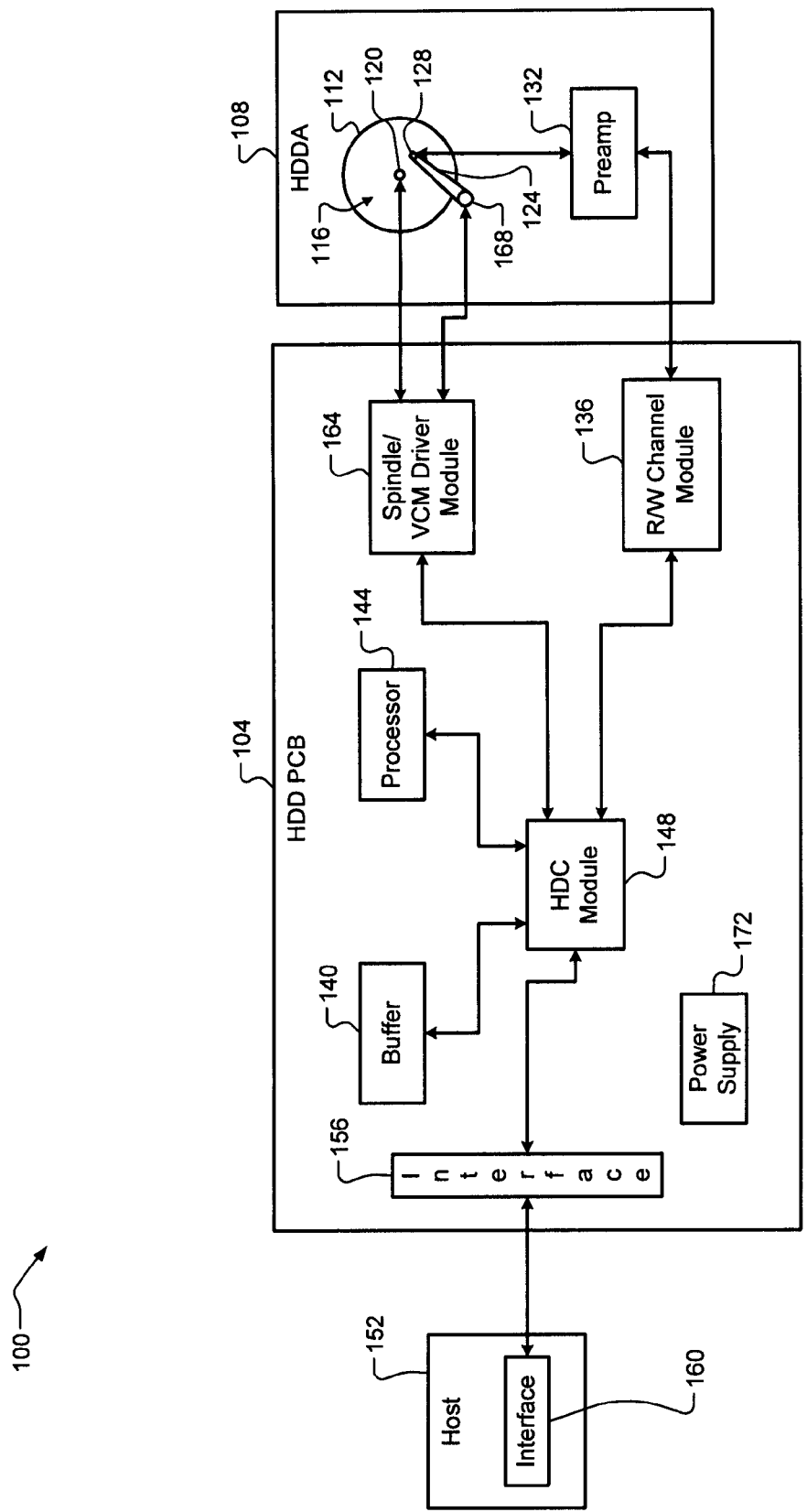
FIG. 1 is a functional block diagram of a hard disk drive system according to the principles of the present disclosure.

To increase hard disk drive (HDD) storage capacity, storage density may be increased by, for example, increasing linear density (e.g., bits per inch) and/or increasing track density (e.g., increasing a number of tracks by moving tracks closer together). Increasing track density may cause increased interference from adjacent tracks. For example, as tracks are moved closer together, a read head of the HDD may not scale (i.e., decrease in size) proportionately. A reader portion of the read head may have a diameter larger than a width of a track, or may be positioned to overlap portions of more than one track. Accordingly, the read head may be less sensitive with respect to detecting a preamble on a target track (i.e., a track that the read head is positioned over), and preambles of adjacent tracks may interfere (e.g., may cause inter track interference, or ITI) with the ability of a read channel to detect the preamble of the target track.

For example only, if preambles of adjacent tracks (i.e., tracks adjacent to the target track) are aligned in phase with the preamble of the target track, then signals (i.e., ITI) originating from the preambles of the adjacent tracks may contribute constructively to detection of the preamble of the target track. Accordingly, the read channel may perform timing acquisition despite the ITI caused by the preambles of the adjacent tracks. Conversely, if the preambles of the adjacent tracks are not aligned in phase with the preamble of the target track, the ITI may contribute destructively to detection of the preamble of the target track (e.g., by cancelling out portions of the detected preamble). For example, the ITI may decrease a signal amplitude associated with the detected preamble, thereby decreasing a signal to noise ratio (SNR), and/or may shift a phase of the detected preamble.

In a timing acquisition system according to the principles of the present disclosure, preambles of adjacent tracks are encoded to include different respective timing recovery patterns. For example, the preamble of a first track includes a first timing recovery pattern. The preambles of second and third tracks adjacent to the first track include a second timing recovery pattern that is different than the first timing recovery pattern. Or, a first track includes a first timing recovery pattern, a second track includes a second timing recovery pattern different than the first timing recovery pattern, and a third track includes a third timing recovery pattern different than both the first timing recovery pattern and the second timing recovery pattern.

For example a period (a frequency) of a timing recovery pattern of a first track may be double the period (half the frequency) of a timing recovery pattern of a second track. For example only, the timing recovery pattern of the first track includes a 2T pattern (i.e., a pattern that flips every two bits, or 1100) while the timing recovery pattern of the second track includes a 4T pattern (11110000). Or the timing recovery pattern of the first track includes the 2T pattern while the timing recovery pattern of the second track includes a 3T pattern (111000). Accordingly, a read channel distinguishes between the preamble of the target track and preambles of adjacent tracks. For example, the read channel filters out ITI caused by the preambles of the adjacent tracks based on a known or expected period (and frequency) of the preamble of the target track.

Referring now to FIG. 1, a hard disk drive (HDD) system 100 includes an HDD printed circuit board (HDD PCB) 104 and an HDD assembly (HDDA) 108. The HDDA 108 includes one or more platters 112 that are each coated with a magnetic medium 116. The magnetic medium 116 stores positive and negative magnetic fields that represent data. Although the HDD system 100 is described, the principles of the present disclosure may also be implemented in other systems that include track-based storage, including, but not limited to, DVD and CD systems.

A spindle motor, shown schematically at 120, rotates the platters 112. Generally, the spindle motor 120 controls the platters 112 based on a predetermined operating speed (e.g., angular velocity) when data is being written to or read from the platters 112. For example only, the predetermined operating speed may be set to 3600, 7200, or 15000 revolutions per minute (rpm), although other speeds may be used. One or more read/write arms 124 move relative to the platters 112 to write data to or read data from the platters 112.

A read/write device 128 is located near a distal end of the read/write arm 124. The read/write device 128 includes a write element such as an inductor that generates a magnetic field. The read/write device 128 also includes a read element (such as a magneto-resistive (MR) head) that senses the magnetic field on the platters 112 and generates an analog read signal accordingly.

A preamplifier module 132 amplifies the analog read/write signals. More specifically, when reading data, the preamplifier module 132 amplifies the analog read signal from the read element and outputs the amplified signal to a read/write (R/W) channel module 136. When writing data, a write current is generated which flows through the write element of the read/write device 128. The write current is switched to produce a magnetic field having a positive or negative polarity. The positive or negative polarity is stored by the platters 112 and is used to represent data.

The HDD PCB 104 typically includes a buffer 140 that stores data that is associated with the control of the HDD system 100 and/or buffers data to allow data to be collected and transmitted as larger data blocks to improve efficiency. The buffer 140 may include, for example, dynamic random access memory (DRAM), synchronous DRAM (SDRAM), double data rate (DDR), and/or any other type of memory having low latency. A processor 144 performs processing related to the operation of the HDDA 108 and various components of the HDD PCB 104.

The HDD PCB 104 further includes a hard disk control (HDC) module 148 that communicates with a host device 152 via an input/output (I/O) interface 156. The I/O interface 156 may include any suitable type of interface. For example only, the I/O interface 156 may be a serial or parallel interface, such as an Integrated Drive Electronics (IDE), Advanced Technology Attachment (ATA), or serial ATA (SATA) interface. The I/O interface 156 communicates with an I/O interface 160 that is associated with the host device 152.

The HDC module 148 also communicates with a spindle/voice coil motor (VCM) driver or module 164 and/or the read/write channel module 136. The spindle/VCM driver 164 controls the spindle motor 120 and, therefore, rotation of the platters 112. The spindle/VCM driver 164 also controls actuation of the read/write arm 124 and, therefore, position of the read/write arm 124 and the read/write device 128. For example only, the spindle/VCM driver 164 may control a voice coil actuator, a stepper motor, and/or any other suitable actuator 168 that controls the read/write arm 124. A power supply 172 supplies power for the HDD PCB 104 and/or the HDDA 108.

The HDDA 108 (e.g., the platters 112) and the read/write channel module 136 implements the timing acquisition system according to the principles of the present disclosure. For example, preambles of adjacent tracks of the platters 112 are encoded to include different recovery patterns. For example only, the preamble of a first track may include a first timing recovery pattern, and the preambles of second and third tracks adjacent to the first track may include a second timing recovery pattern that is different than the first timing recovery pattern. Or, a first track may include a first timing recovery pattern, a second track may include a second timing recovery pattern different than the first timing recovery pattern, and a third track may include a third timing recovery pattern different than both the first timing recovery pattern and the second timing recovery pattern. For example, the different timing recovery patterns of adjacent tracks may have different periods.

The R/W channel module 136 distinguishes between the preamble of a target track and preambles of adjacent tracks. For example, the read/write channel module 136 may filter out ITI caused by the preambles of the adjacent tracks based on a known or expected period (and frequency) of the preamble of the target track.

Referring now to FIGS. 2A, 2B, and 2C, and 2D, example tracks 200 including a target track 204 and adjacent tracks 208 and 212 each include servo data 216 (e.g., in a servo wedge), a sync mark 220, and user data 224. The R/W channel module 136 achieves servo lock on a particular track based on the corresponding servo data 216. After achieving servo lock and acquiring timing, the read/write channel module 136 detects the sync mark 220 and reads the user data 224. The read/write channel module 136 acquires timing based on respective preambles 228-1, 228-2, and 228-3, referred to collectively as preambles 228.

Figure 2:
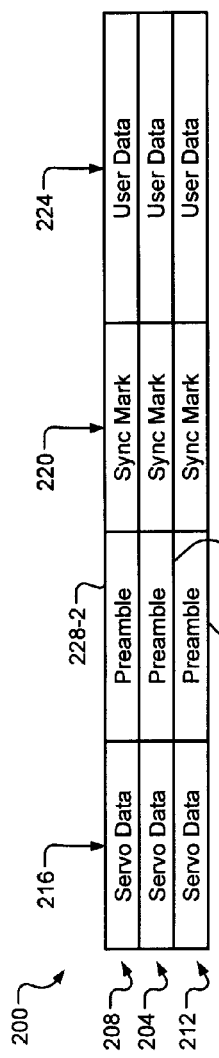
FIGS. 2A, 2B, 2C, and 2D illustrate preamble patterns according to the principles of the present disclosure.

As shown in FIG. 2B, the preamble 228-1 of the target track 204 includes a 2T timing recovery pattern. Conversely, the preambles 228-2 and 228-3 of the adjacent tracks 208 and 212 include a 4T timing recovery pattern. As shown in FIG. 2C, the preamble 228-1 of the target track 204 includes a 2T timing recovery pattern. Conversely, the preambles 228-2 and 228-3 of the adjacent tracks 208 and 212 include a 3T timing recovery pattern. As shown in FIG. 2D, the preamble 228-1 of the target track 204 includes a 2T timing recovery pattern. Conversely, the preamble 228-2 of the adjacent track 208 includes a 3T timing recovery pattern and the preamble 228-3 of the adjacent track 212 includes a 4T timing recovery pattern. Other arrangements of adjacent tracks having different timing recovery patterns (i.e., timing recovery patterns having different periods or frequencies) may be used. Further, respective phases of the preambles 228 may be the same, or may be different from one another. For example, the preamble 228-1 may have a phase that is different from the phases of the preambles 228-2 and 228-3. In other words, in FIGS. 2B, 2C, and 2D, each of the preambles 228 is shown as beginning with a binary "1" (i.e., having the same phase), but the preambles 228 may begin with any bit of the corresponding timing recovery pattern.

The different preambles 228 for the respective tracks 200 may be predetermined for a given HDD or application. For example, preambles of even tracks are encoded with a first timing recovery pattern (e.g., a first timing recovery pattern having a first period) while preambles of odd tracks are encoded with a second timing recovery pattern (e.g., a second timing recovery pattern having a second period). The read/write channel module 136 determines a timing recovery pattern for a given track based on the servo data 216. For example only, the servo data indicates whether the read/write device 128 is positioned over an even track or an odd track based on the servo data 216. For example, the read/write channel module 136 determines whether the read/write device 128 is positioned over an even track or an odd track after achieving servo lock based on the servo data 216. Accordingly, the read/write channel module 136 determines which preamble (and, accordingly, which timing recovery pattern) is associated with a given track based on the determination of whether the read/write device 128 is positioned over an even track or an odd track. Or, the read/write channel module 136 determines which preamble is associated with a given track by any other suitable method.

Figure 3:
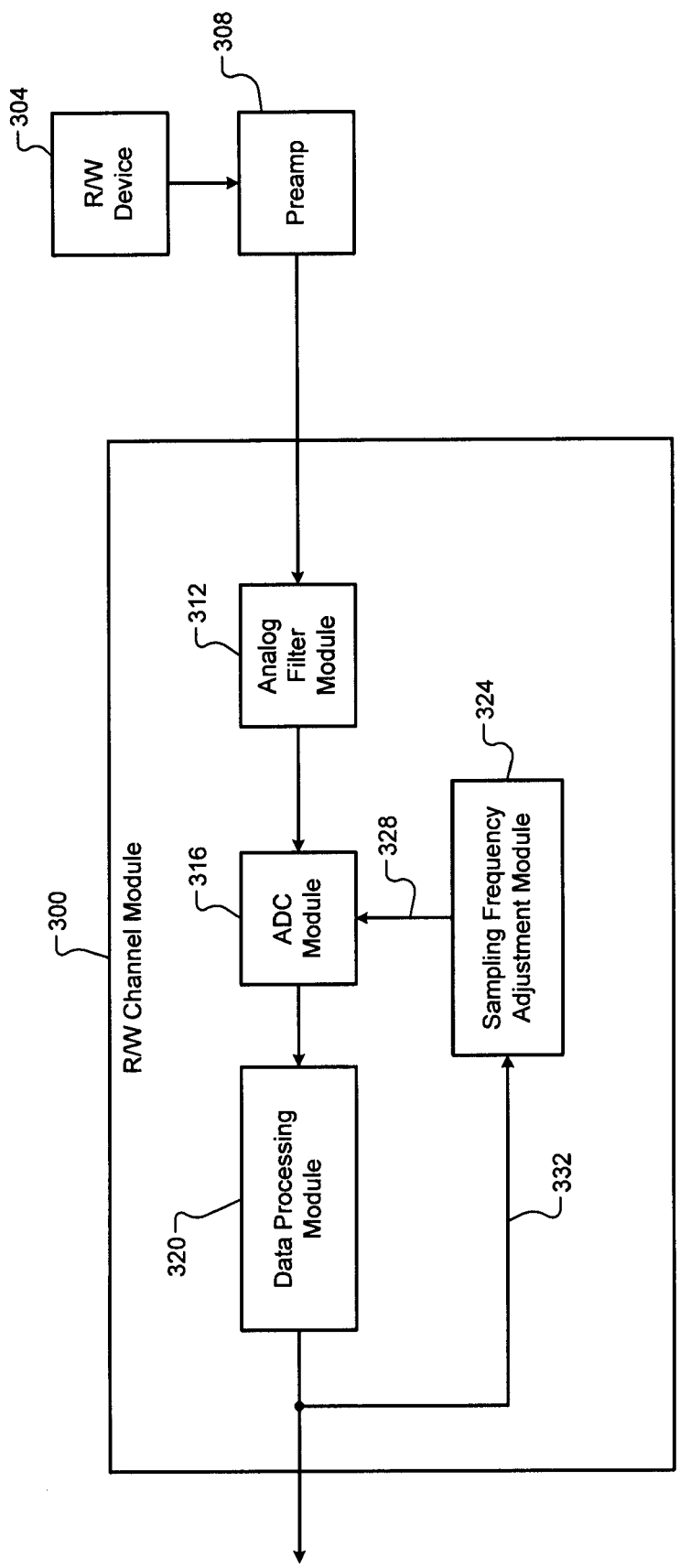
FIG. 3 is a functional block diagram of a read/write channel module according to the principles of the present disclosure.

Referring now to FIG. 3, an example read/write channel module 300 receives an analog read signal from a read/write device 304 via a preamplifier module 308. For example, a read element (such as a magneto-resistive (MR) head) of the read/write device 304 senses magnetic fields on the platter 112 and generates the analog read signal accordingly. In particular, the read/write device 304 generates the analog read signal based on data read from a target track of the platter 112. The preamplifier module 308 amplifies the analog read signal and outputs an amplified read signal to the read/write channel module 300.

The read/write channel module 300 includes an analog filter module 312, an analog-to-digital converter (ADC) module 316, and a data processing module 320. The read/write channel module 300 may also include a sampling frequency adjustment module 324 and one or more other components (not shown) associated with the operation of the read/write channel module.

The analog filter module 312 filters the amplified read signal provided by the preamplifier module 308 and provides the filtered read signal to the ADC module 316. The ADC module 316 samples the filtered read signal at a sampling frequency set by the sampling frequency adjustment module 324. For example only, the sampling frequency adjustment module 324 outputs a clock 328 that provides pulses to the ADC module 316 corresponding to the sampling frequency. While not shown, when writing data, the read/write channel module 300 also writes the data to the platter 112 based on the frequency set by the clock 328. The sampling frequency adjustment module 324 may control the sampling frequency (e.g., via the clock 328) based on a feedback signal 332.

The data processing module 320 performs, for example, digital filtering and detecting to filter the samples provided by the ADC module 316, and to process the filtered samples into a data bit sequence. For example only, the data processing module 320 processes the filtered samples into a data bit sequence of binary ones and zeros. The data processing module 320 outputs the data bit sequence to the HDC module 148, which then outputs the data bit sequence to the host device 152, the buffer 140, the processor 144, and/or another suitable module or device.

The data processing module 320 (and/or, in some implementations, the analog filter module 312) may implement functions of a timing acquisition system according to the principles of the present disclosure. For example, the data processing module 320 determines which preamble is associated with a target track associated with the analog read signal, and filters out ITI from adjacent tracks.

During timing acquisition, the analog read signal includes a readback signal corresponding to the timing recovery pattern. For example only, a readback signal corresponding to a 2T timing recovery pattern may be a sine wave having a period of 4T. The data processing module 320 estimates a phase of the readback signal and determines the timing recovery pattern based on the phase of the readback signal. The data processing module 320 may adjust an interpolator or sampling phase to achieve a desired sampling phase accordingly. For example, the data processing module 320 adjusts the sampling phase to sample at positive and negative peaks and a zero crossing of the readback signal.

In the timing acquisition system according to the principles of the present disclosure, the data processing module 320 filters out components of the readback signal corresponding to ITI from adjacent tracks according to a known or expected period (frequency) associated with the preamble of the target track. For example, if the preamble of the target track has a 2T timing recovery pattern, then the corresponding readback signal will have a frequency corresponding to the 2T timing recovery pattern. Conversely, signal components of the readback signal corresponding to the adjacent tracks (i.e., to a different timing recovery pattern) will have a frequency that does not correspond to the 2T timing recovery pattern. Accordingly, if the data processing module 320 is attempting to achieve timing acquisition on a target track having the 2T timing recovery pattern, the data processing module 320 may filter out signal components having a frequency that does not correspond to the 2T timing recovery pattern. Then, the data processing module 320 estimates the phase of the readback signal for sampling without the ITI components.

For example, the data processing module 320 implements a filter such as a discrete Fourier transform (DFT) filter or a bandpass filter to achieve timing acquisition on the preamble of the target track. The filter may be configured according to a frequency of interest (i.e., the frequency associated with the 2T timing recovery pattern) to cancel out the interfering frequency (e.g., the frequency associated with a 4T timing recovery pattern of adjacent tracks). For example only, if the filter includes a DFT filter, the DFT filter is be configured according to a DFT that has spectral nulls at the frequency associated with the 4T timing recovery pattern.

Conversely, if the data processing module 320 is attempting to achieve timing acquisition on a target track having the 4T timing recovery pattern, the data processing module 320 filters out signal components having a frequency that does not correspond to the 4T timing recovery pattern. Accordingly, the filter may be configured according to the frequency associated with the 4T timing recovery pattern to cancel out the frequency associated with the 2T timing recovery pattern of adjacent tracks). For example only, if the filter includes a DFT filter, the DFT filter is configured according to a DFT that has spectral nulls at the frequency associated with the 2T timing recovery pattern. In other implementations, the filter may be configured according to attenuated amplitudes of the timing recovery patterns of the adjacent tracks.

Figure 4:
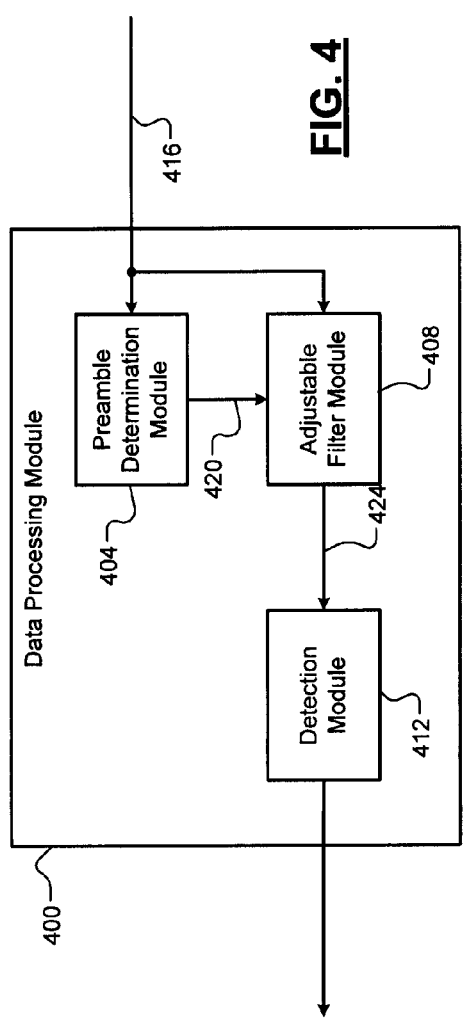
FIG. 4 is a functional block diagram of a first example data processing module according to the principles of the present disclosure.

Referring now to FIG. 4, an example data processing module 400 includes a preamble determination module 404, an adjustable filter module 408, and a detection module 412. The preamble determination module 404 determines an expected preamble of a target track based on, for example, a readback signal 416. For example only, the preamble determination module 404 may determine the expected preamble based on servo data (e.g., the servo data may be encoded with information indicative of the expected preamble) and/or a determination of whether the target track is an even track or an odd track. The preamble determination module 404 provides a control signal 420 to the adjustable filter module 408 based on the expected preamble. For example only, the control signal 420 is be an adjustment signal to adjust filter parameters of the adjustable filter module 408, an indication of the timing recovery pattern of the target track, and/or merely an indication of whether the target track is an even track or an odd track. Or, the preamble determination module 404 determines desired filter parameters based on the expected preamble and provide the control signal based on the desired filter parameters.

The adjustable filter module 408 filters the readback signal 420 based on an expected preamble of the target track determined from the control signal 420. For example, if the control signal 420 indicates that the target track includes a preamble having a 2T timing recovery pattern, then the adjustable filter module 408 is configured to filter out frequencies associated with a 4T timing recovery pattern. Conversely, if the control signal 420 indicates that the target track includes a preamble having a 4T timing recovery pattern, then the adjustable filter module 408 is configured to filter out frequencies associated with a 2T timing recovery pattern. The adjustable filter module 408 provides a filtered readback signal 424 to the detection module 412 for timing acquisition, sync mark detection, and other digital and/or control functions.

Figure 5:
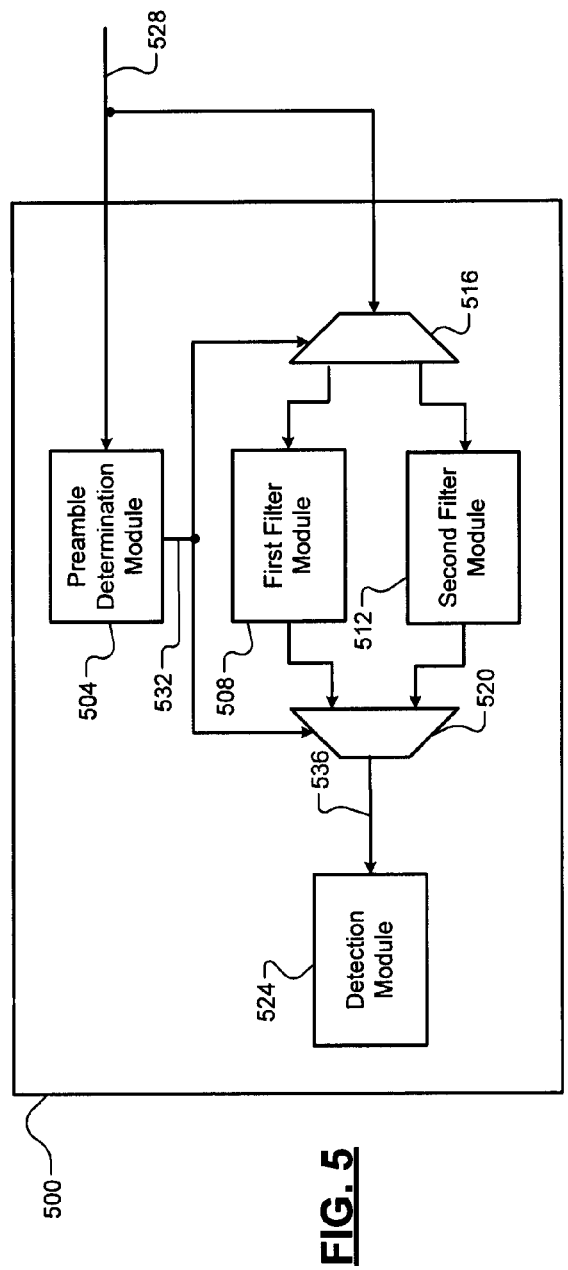
FIG. 5 is a functional block diagram of a second example data processing module according to the principles of the present disclosure.

Referring now to FIG. 5, an example data processing module 500 includes a preamble determination module 504, a first filter module 508, a second filter module 512, switches 516 and 520, and a detection module 524. The preamble determination module 504 determines an expected preamble of a target track based on, for example, a readback signal 528. Or, the preamble determination module 504 may simply determine the expected preamble based on a determination of whether the target track is an even track or an odd track. The preamble determination module 504 provides a selection signal 532 to switches 516 and 520 based on the expected preamble, and/or based on desired filter parameters associated with the expected preamble.

The readback signal 528 is filtered according to the selection signal 532. For example, the first filter module 508 is associated with an expected preamble having a 2T timing recovery pattern. Accordingly, the first filter module 508 filters out frequencies associated with a 4T timing recovery pattern. Conversely, second filter module 512 may be associated with an expected preamble having a 4T timing recovery pattern. Accordingly, the second filter module 512 filters out frequencies associated with a 2T timing recovery pattern. The selection signal 532 operates the switches 516 and 520 to select one of the first filter module 508 and the second filter module 512. Accordingly, an output 536 of the switch 520 includes a filtered readback signal corresponding to the selected one of the first filter module 508 and the second filter module 512.

Figure 6:
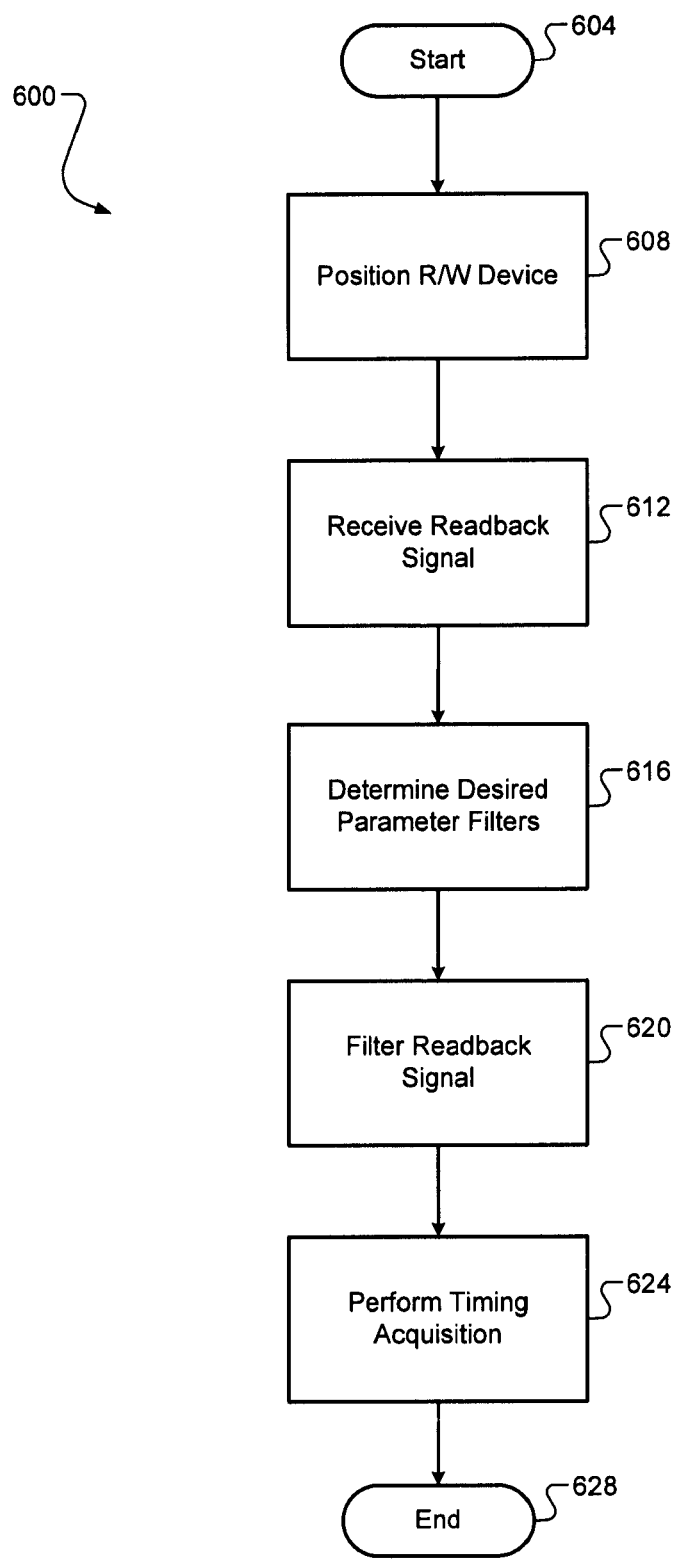
FIG. 6 illustrates a timing acquisition method 600 according to the principles of the present disclosure.

Referring now to FIG. 6, a timing acquisition method 600 begins at 604. At 608, the method 600 positions a read/write device over a target track. At 612, the method 600 receives a readback signal from the read/write device. At 616, the method 600 determines desired filter parameters. For example, the method 600 may determine the desired filter parameters based on whether the target track is an even track or an odd track, an expected preamble of the target track, and/or characteristics of the readback signal. At 620, the method 600 filters the readback signal according to the desired filter parameters. At 624, the method 600 performs timing acquisition on the preamble of the target track based on the filtered readback signal. The method 600 ends at 628.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system, comprising:
 a preamble determination module configured to determine an expected preamble of a target track, wherein the expected preamble corresponds to a preamble that is expected to be in the target track and includes an associated timing recovery pattern; and
 a filter module configured to receive a readback signal read from the target track based on the expected preamble, and selectively filter the readback signal to remove inter track interference from the readback signal based on the expected preamble, wherein
  the inter track interference corresponds to at least one preamble of a track adjacent to the target track,
  the at least one preamble includes a second timing recovery pattern that is different than the timing recovery pattern, and
  the timing recovery pattern has a first period and the second timing recovery pattern has a second period different than the first period.

2. The system of claim 1, wherein the timing recovery pattern includes a 2T bit pattern having a 4T period and the second timing recovery pattern includes a 4T bit pattern having an 8T period.

3. The system of claim 1, wherein the timing recovery pattern includes a 2T bit pattern having a 4T period and the second timing recovery pattern includes a 3T bit pattern having a 6T period.

4. The system of claim 1, wherein the preamble determination module is configured to determine the expected preamble based on at least one of a determination of whether the target track is an even track or an odd track, servo data associated with the target track, and the readback signal.

5. The system of claim 1, wherein:
 the preamble determination module is configured to determine filter parameters based on the expected preamble; and
 the filter module is configured to filter the readback signal based on the filter parameters.

6. The system of claim 5, wherein the filter parameters correspond to at least one of spectral nulls associated with a second timing recovery pattern and attenuated amplitudes of the second timing recovery pattern.

7. The system of claim 5, wherein the filter parameters correspond to a Discrete Fourier Transform.

8. The system of claim 1, wherein the filter module includes an adjustable filter having filter parameters that are configurable according to the expected preamble.

9. A system, comprising:
 a preamble determination module configured to determine an expected preamble of a target track, wherein the expected preamble corresponds to a preamble that is expected to be in the target track and includes an associated timing recovery pattern; and
 a filter module configured to receive a readback signal read from the target track based on the expected preamble, and selectively filter the readback signal to remove inter track interference from the readback signal based on the expected preamble,
 wherein the filter module includes:
  a first filter module configured to filter the readback signal according to the timing recovery pattern; and
  a second filter module configured to filter the readback signal according to a second timing recovery pattern.

10. A method, comprising:
 determining an expected preamble of a target track, wherein the expected preamble includes an associated timing recovery pattern;
 receiving a readback signal read from the target track based on the expected preamble; and
 selectively filtering the readback signal to remove inter track interference from the readback signal based on the expected preamble, wherein
  the inter track interference corresponds to at least one preamble of a track adjacent to the target track,
  the at least one preamble includes a second timing recovery pattern that is different than the timing recovery pattern, and
  the timing recovery pattern has a first period and the second timing recovery pattern has a second period different than the first period.

11. The method of claim 10, wherein the timing recovery pattern includes a 2T bit pattern having a 4T period and the second timing recovery pattern includes a 4T bit pattern having an 8T period.

12. The method of claim 10, wherein the timing recovery pattern includes a 2T bit pattern having a 4T period and the second timing recovery pattern includes a 3T bit pattern having a 6T period.

13. The method of claim 10, wherein determining the expected preamble includes determining the expected preamble based on at least one of a determination of whether the target track is an even track or an odd track, servo data associated with the target track, and the readback signal.

14. The method of claim 10, further comprising:
 determining filter parameters based on the expected preamble; and filtering the readback signal based on the filter parameters.

15. The method of claim 14, wherein the filter parameters correspond to at least one of spectral nulls associated with a second timing recovery pattern, attenuated amplitudes of the second timing recovery pattern, and a Discrete Fourier Transform.

16. The method of claim 10, further comprising:
 using a first filter module, filtering the readback signal according to the timing recovery pattern; and
 using a second filter module, filtering the readback signal according to a second timing recovery pattern.

* * * * *